US009602632B2

(12) United States Patent
Zhang et al.

(10) Patent No.: US 9,602,632 B2
(45) Date of Patent: Mar. 21, 2017

(54) CONTENT ENCODING PRE-SYNCHRONIZATION METHOD, DEVICE AND SYSTEM (71) Applicant: Huawei Technologies Co., Ltd., Shenzhen (CN)

(72) Inventors: Wei Zhang, Shenzhen (CN); Enbo Wang, Shenzhen (CN); Chenghui Peng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 213 days.

(21) Appl. No.: 14/463,131

(22) Filed: Aug. 19, 2014

(65) Prior Publication Data
US 2015/0003476 A1 Jan. 1, 2015

Related U.S. Application Data (63) Continuation of application No. PCT/CN2012/075782, filed on May 19, 2012.

(30) Foreign Application Priority Data

Feb. 20, 2012 (CN) .......................... 2012 1 0038212

(51) Int. Cl.
H04L 29/06 (2006.01)
H04W 24/02 (2009.01)
(Continued)

(52) U.S. Cl.
CPC ............. *H04L 69/04* (2013.01); *H04W 24/02* (2013.01); *H04L 67/2828* (2013.01); *H04W 28/06* (2013.01); *H04W 92/045* (2013.01)

(58) Field of Classification Search
None
See application file for complete search history.

(56) References Cited

U.S. PATENT DOCUMENTS

2002/0010761 A1 1/2002 Carneal et al.
2002/0169828 A1 11/2002 Blanchard
(Continued)

FOREIGN PATENT DOCUMENTS

CN 1465019 A 12/2003
CN 1778132 A 5/2006
(Continued)

Primary Examiner — Kodzovi Acolatse
(74) Attorney, Agent, or Firm — Brinks Gilson & Lione (57) ABSTRACT Disclosed is a content encoding pre-synchronization method, comprising: a network device selecting a popular index with a high frequency of appearance from all indexes stored by the network device; determining, among base stations under management, another base station that is of the same type as a base station receiving the popular index, and when the link is idle, sending the popular index and data corresponding to the popular index to the base station. In the content encoding pre-synchronization method provided by an embodiment of the present invention, a popular index and a base station to which the index may be sent can be predetermined, and when the link is idle, the popular index is sent to the corresponding base station in advance, thereby reducing the sending delay in busy time, improving the compression ratio in busy time, and avoiding a loss of synchronization data caused by a busy link.

18 Claims, 8 Drawing Sheets (51) Int. Cl.
*H04W 28/06* (2009.01)
*H04L 29/08* (2006.01)
*H04W 92/04* (2009.01)

(56) References Cited

U.S. PATENT DOCUMENTS

| | | | |
|---|---|---|---|
| 2003/0147454 A1 | 8/2003 | Kwon et al. | |
| 2006/0233146 A1 | 10/2006 | Nagata et al. | |
| 2007/0046698 A1* | 3/2007 | Nam .................. | G06F 3/14 345/660 |
| 2008/0151901 A1* | 6/2008 | Yang .................. | H04L 1/0079 370/394 |
| 2008/0229137 A1 | 9/2008 | Samuels et al. | |
| 2009/0022107 A1* | 1/2009 | Kapoor .................. | H04L 69/04 370/331 |
| 2011/0124289 A1* | 5/2011 | Balachandran ...... | H04J 11/0053 455/63.1 |
| 2011/0173209 A1* | 7/2011 | Fortier ................ | H03M 7/3086 707/747 |
| 2012/0190389 A1* | 7/2012 | Hui .................... | H03M 7/3073 455/500 |
| 2012/0257579 A1 | 10/2012 | Li et al. | |
| 2014/0050276 A1 | 2/2014 | Zhang et al. | |

FOREIGN PATENT DOCUMENTS

| | | |
|---|---|---|
| CN | 101051913 A | 10/2007 |
| CN | 102082639 A | 6/2011 |
| CN | 102104452 A | 6/2011 |
| CN | 102202348 A | 9/2011 |
| EP | 2007104 A1 | 12/2008 |

\* cited by examiner

CONTENT ENCODING PRE-SYNCHRONIZATION METHOD, DEVICE AND SYSTEM

CROSS-REFERENCE TO RELATED APPLICATIONS

This application is a continuation application of International Application No. PCT/CN2012/075782, filed on May 19, 2012, which claims priority to Chinese patent application No. 201210038212.X, filed on Feb. 20, 2012, both of which are hereby incorporated by reference in their entireties.

FIELD

The present invention relates to the field of communication technology, and in particular to a content encoding pre-synchronization method, device and system.

BACKGROUND

With the pressure of increasing of the operation cost and the bandwidth pressure brought by the development of data traffic, optimization of data transmission on a Backhaul becomes a hot issue concerned by operators. There currently exists two ways for optimizing the data transmission on the Backhaul: one is to perform a physical expansion on the Backhaul to increase transmission resource and the other is to compress the data transmitted on the Backhaul. The physical expansion is capable of increasing the carrying capability of the Backhaul with an increased cost. In comparison, data compression is an effective way to optimize the data transmission on the Backhaul. Content encoding is a typical method for fine-grain data compressing, and the pressure of the Backhaul may be relieved greatly if the content encoding is applied in the wireless network.

The content encoding method includes: slicing payload data on the Backhaul, recognizing repeated data slices in the payload and replacing the repeated data with a small index, to reduce transmitted amount of data. In the case where the content encoding technology is applied to a wireless network, it is necessary to dispose a pair of peer devices between a network device and a base station for compressing/decompressing the data transmitted on the backhaul. The network device includes a Radio Network controller (RNC), a Servering Gateway (S-GW) and the like. After receiving the data, the network device firstly slices the data and performs a hash calculation on the sliced data to obtain an index, then stores the index, the original data and the corresponding relationship between them and sends the small index having little data instead of the original data to the base station. After receiving the index, the base station replaces the index with the original data to achieve a data compression on the backhaul.

The index, original data and the correspondence relationship between them also need to be stored in the base station to enable the base station to replace the received index with the original data. Generally, RNC or S-GW needs to synchronize the index and original data stored therein to a peer device. In the wireless network, the relationship between RNC or S-GW and the base station is a one-to-many relationship, that is, there are many base stations acquiring the same data from RNC or S-GW. During the synchronization, in the case of network congestion, a busy link and the like, the delay of synchronization may be longer, or the synchronization data may be lost, and as a result, the base station can not decompress the data correctly.

SUMMARY

An embodiment of the present disclosure provides a method for content encoding pre-synchronization, in which an index and data corresponding to the index may be pre-synchronized between a network device and multiple base stations. Thereby a synchronization delay is reduced and a compression ratio is improved when a link is busy. In addition, the embodiment of the present disclosure further provides a corresponding device and system.

A method for content encoding pre-synchronization includes:

selecting, by a network device, an index with the number of appearance being greater than a first preset threshold, from all indexes for content encoding stored by the network device as a popular index;

determining, from base stations being managed, all base stations which have received both the popular index and data corresponding to the popular index;

for each of all the base stations, querying in a pre-built base station classification table, determining other base stations which are the same type as the base station, and selecting, from the other base stations, base stations which have not received the popular index and the data corresponding to the popular index as target base stations; and sending the popular index and the data corresponding to the popular index to one of the target base stations, in the case where a data link from the network device to the target base station is idle.

A method for content encoding pre-synchronization includes:

selecting, by a network device, an index with the number of appearance being greater than a first preset threshold, from all indexes for content encoding stored by the network device as a popular index;

determining, from base stations being managed, all base stations which have received both the popular index and data corresponding to the popular index;

for each of all the base stations, querying in a pre-built base station classification table, determining other base stations which are the same type as the base station, and selecting, from the other base stations, base stations which have not received the popular index and the data corresponding to the popular index as target base stations; and sending indication information which carries information of the target base stations to at least one of all the base stations, to enable the base station receiving the indication information to send the popular index and the data corresponding to the popular index to one of the target base stations, in the case where a data link from the base station receiving the indication information to the target base station is idle.

A method for content encoding pre-synchronization includes:

receiving, by a base station, an index for content encoding, data corresponding to the index and indication information carrying information of target base stations; and sending the index and the data corresponding to the index to one of the target base stations, in the case where a data link from the base station to the target base station is idle.

A network device includes:

a first selection unit, configured to select an index with the number of appearance being greater than a first preset threshold, from all indexes for content encoding stored by the network device as a popular index;

a first determination unit, configured to determine, from base stations being managed, all base stations having received both the popular index acquired by the first selection unit and data corresponding to the popular index;

a first query unit, configured to, for each of all the base stations determined by the first determination unit, query in a pre-built base station classification table, determine other base stations which are the same type as the base station, and select, from the other base stations, base stations which have not received the popular index and the data corresponding to the popular index, as target base stations; and a first sending unit, configured to send the popular index and the data corresponding to the popular index to one of the target base stations queried by the first query unit, in the case where a data link from the network device to the target base station is idle.

A network device includes:

a second selection unit, configured to select an index with the number of appearance being greater than a first preset threshold, from all indexes for content encoding stored by the network device as a popular index;

a second determination unit, configured to determine, from base stations being managed, all base stations having received both the popular index acquired by the second selection unit and data corresponding to the popular index;

a second query unit, configured to, for each of all the base stations determined by the second determination unit, query in a pre-built base station classification table, determine other base stations which are the same type as the base station, and select, from the other base stations, base stations which have not received the popular index and the data corresponding to the popular index as target base stations; and a second sending unit, configured to send indication information, which carries information of the target base stations queried by the second query unit, to at least one of all the base stations determined by the second determination unit, to enable the base station receiving the indication information to send the popular index and the data corresponding to the popular index to one of the target base stations, in the case where a data link from the base station receiving the indication information to the target base station is idle.

A base station includes:

a receiving unit, configured to receive an index for content encoding, data corresponding to the index and indication information carrying information of target base stations; and a third sending unit, configured to send the index and the data corresponding to the index to one of the target base stations, in the case where a data link from the base station to the target base station is idle.

A system for content encoding pre-synchronization, including: a network device and at least one base station; wherein the network device is configured to: select an index with the number of appearance being greater than a first preset threshold, from all indexes for content encoding stored by the network device as a popular index; determine, from base stations being managed, all base stations having received both the popular index acquired by the first selection unit and data corresponding to the popular index; for each of the all base stations, query in a pre-built base station classification table, determine other base stations which are the same type as the base station, and select, from the other base stations, base stations which have not received the popular index and the data corresponding to the popular index as target base stations; and send the popular index and the data corresponding to the popular index to one of the target base stations queried by the first query unit, in the case where a data link from the network device to the target base station is idle; and the base station is configured to receive the popular index and the data corresponding to the popular index sent by the network device.

In the above scheme of the embodiment of the present disclosure, a network device selects a popular index with a high frequency of appearance from all indexes stored by the network device; determines, from base stations being managed, other base stations which are the same type as a base station having received the popular index, and sends the popular index and data corresponding to the popular index to the determined base station when the link to the determined base station is idle. In comparison with an existing method in which an index and data corresponding to the index are only sent while needed, the method for content encoding pre-synchronization provided by the embodiment of the present disclosure may determine the popular index and a base station to which the popular index may be sent in advance, and send the popular index to the corresponding base station in advance when the link is idle, thereby reduces the sending delay in busy time, improves the compression ratio in busy time, and avoids a loss of synchronization data caused by a busy link.

DETAILED DESCRIPTION

Embodiments of the present disclosure provide a method for content encoding pre-synchronization, in which an index and data corresponding to the index may be pre-synchronized between a network device and multiple base stations. Thereby a synchronization delay when a link is busy is reduced and a compression ratio when a link is busy is improved. In addition, the embodiments of the present disclosure further provide a corresponding device and system. In the following, the method, device and system are described in detail.

In the embodiment of the present disclosure, the network device refers to a Radio Network Controller (RNC), a Servering Gateway (S-GW) and a Packet Data Network Gateway (P-GW).

Figure 1:
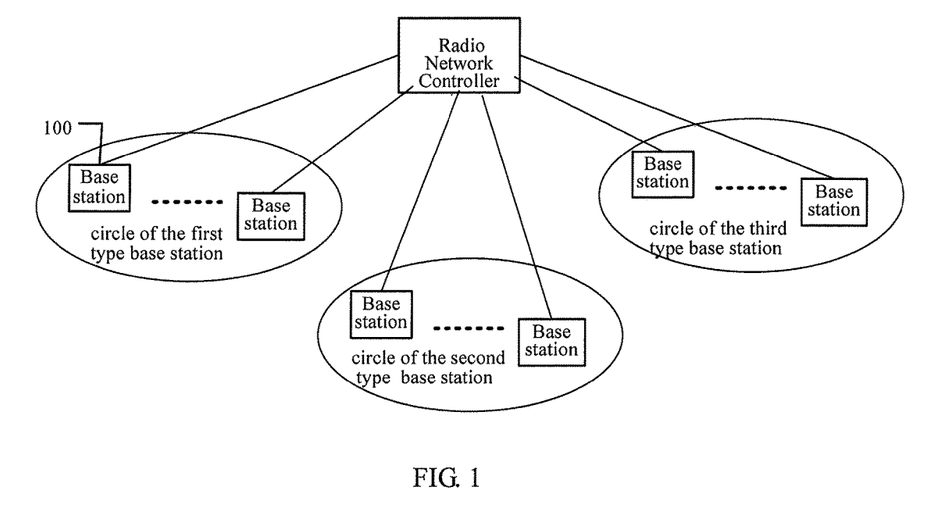
FIG. 1 is a schematic diagram of a system framework according to an embodiment of the present disclosure.

Referring to FIG. 1, the network device is described by taking RNC as an example. There are three types of base station under the control of RNC: a first type base station, a second type base station and a third type base station. There are multiple base stations in a circle of each type base station. After sending a certain index and data corresponding to the index to base station 100 in the circle of the first type base station, RNC finds that the number of appearance for the index is greater than a preset threshold. Then, in the case where any link from RNC to the circle of the first type base station is idle, RNC may synchronously send the index and the data corresponding to the index to other base stations in addition to base station 100 in the circle of the first type base station. Of course, RNC may also send information of the other base stations in addition to base station 100 in the circle of the first type base station to base station 100, then base station 100 synchronously sends the index and the data corresponding to the index to the other base stations in the circle of the first type base station. The pre-synchronization methods in circles of the second and third type base station are the same as that in the circle of the first type base station, and will not be described hereinafter.

Figure 2:
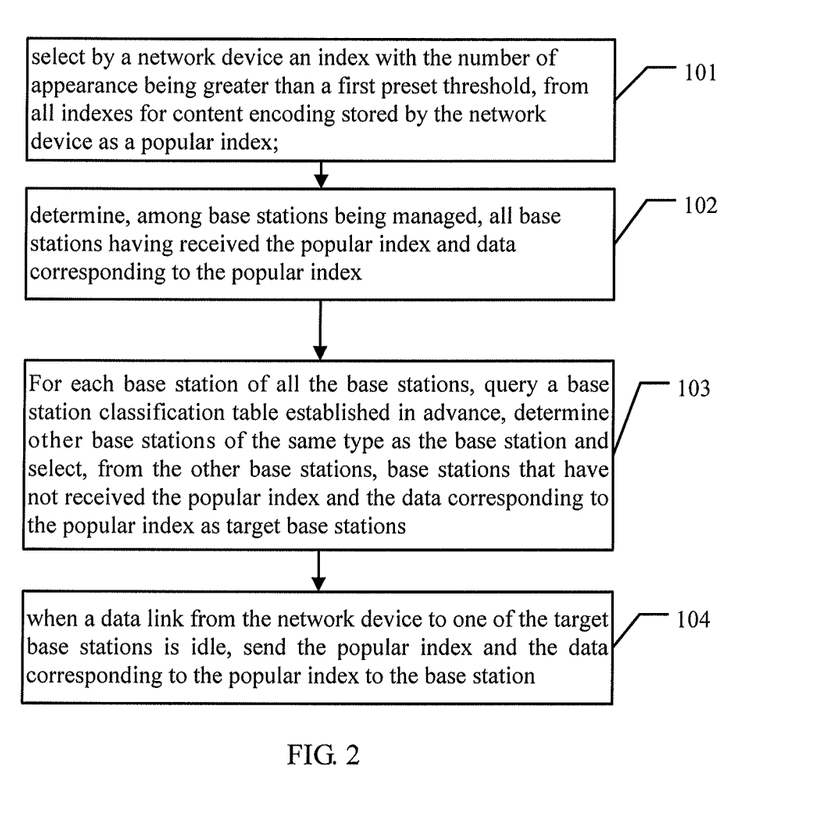
FIG. 2 is a schematic diagram of a method according to an embodiment of the present disclosure.

Referring to FIG. 2, in view of network device, an embodiment of the method for content encoding pre-synchronization provided by the embodiments of the present disclosure includes Steps 101 to 104.

Step 101 is to select, by a network device, an index with the number of appearance being greater than a first preset threshold, from all indexes for content encoding stored by the network device as a popular index.

The first preset threshold mentioned in the embodiment is actually a threshold value set beforehand, such as 10 and 20, and may be adjusted based on the number of the current index or practical network situation.

Content encoding is a data compression method. The network device in the embodiment of the present disclosure is described by taking RNC as an example. After receiving data, RNC slices the data according to the content of the data, slices data with a greater size into several pieces of data with a small size, and perform a hash calculation on the sliced data, in which an index with a less size is used to replace the sliced data. For example, one piece of data with a size of 256 Kbits is sliced into 4 pieces where each piece being 64 Kbits sized. An index corresponding to each piece of data is queried from a hash table. For the same data, the corresponding index is unique, and the space occupied by the index is very small, for example, the index corresponding to the data of 64 Kbits may occupy only a space of 2 bits.

After the index corresponding to the data is determined, the index is compared with indexes having been stored in an internal storage one by one to see whether the index already exists. If the index is found to be already existed after the comparison, then it is only needed that the index is sent to the base station; if index is found to be not existed after the comparison, the index is stored into the internal storage, sliced data corresponding to the index is stored into a hard disk, and the sliced data and the corresponding index are synchronously sent to a base station to which the data is to be sent to enable the base station to store the index and the corresponding sliced data. When each base station receives certain data for the first time, it synchronously receives the data and an index corresponding to the data. Thereby in the case where only the index is received later, the received index may be replaced with the corresponding data according to a correspondence relationship between data and indexes stored beforehand.

In the case where the number of appearance for an index is not greater than the first preset threshold, RNC may select the index as the popular index. Before the popular index is selected, RNC counts the number of appearance in the network device for each of all the indexes and records the name of a base station to which each of the indexes is sent. That is to say, each index, data corresponding to each index and the name of base station to which each index and the data corresponding to each index are sent are associated and stored, and the number of appearance for each index is accumulated. For example, Index 1, data corresponding to Index 1 and the name of the base station which has received Index 1 and the data corresponding to Index 1, are associated and stored, and the number of appearance for Index 1 is accumulated. In the case where the number of appearance for Index 1 is greater than the first preset threshold, the network device may select Index 1 as the popular index.

For example, when Index 1 appears for the first time, Index 1, data corresponding to Index 1 and a base station to which Index 1 and corresponding data are sent are correspondingly stored. In the case where Index 1 appears repeatedly, if the corresponding data is sent to a base station the same as the base station when Index 1 appears for the first time, only Index 1 is needed to be sent to the base station, and the number of appearance for Index 1 is added with 1; when the data corresponding to Index 1 is sent to another base station, Index 1 and the data corresponding to Index 1 are sent synchronously to the another base station, and Index 1, the data corresponding to Index 1 and the name of the base station which has received Index 1 and the data corresponding to Index 1 are associated and stored.

Step 102 is to determine, from base stations being managed, all base stations which have received both the popular index and data corresponding to the popular index.

It can be seen from FIG. 1, one RNC may manage multiple base stations and the base stations managed by the same RNC may obtain data from the RNC. The data obtained by some base stations may have a large amount of repetition, in particular to popular data. How does the RNC determine which data is the popular data and needs to be sent pre-synchronously, which data is not the popular data and does not need to be sent pre-synchronously. In the embodiment of the present disclosure, the above determination is made according to the number of appearance for an index. Assuming that the first preset threshold is 10 times, that is, if Index 1 repeatedly appears for more than 10 times, the number of appearance for Index 1 is considered to be greater than the first preset threshold. If the number of appearance for Index 1 greater than the first preset threshold, for each time, Index 1 may be sent to the same base station or a different base station. Since in the case where Index 1 is sent to the base station for the first time, the data corresponding to Index 1 is needed to be synchronously sent to the base station, the base stations to which Index 1 of which the number of appearance is greater than the first preset threshold is sent can be determined, then all the base stations that the index and the data corresponding to the index have been sent to can be determined. After receiving Index 1 and the data corresponding to Index 1, the base station may send a response to the RNC. Therefore, RNC may determine all the base stations, which have received Index 1 and the data corresponding to Index 1.

The description in the above paragraph may be understood by the following Table 1:

TABLE 1 corresponding storage table for index, data and base station

| Index | Data corresponding to the index | Base station having synchronously received the index and the corresponding data |
|---|---|---|
| Index 1 | Original data 1 | first base station, second base station |
| Index 2 | Original data 2 | first base station, second base station |
| ... | ... | ... |

It can be seen from Table 1 that Index 1 and Original data 1 have been correspondingly sent to the first and second base stations and Index 2 and Original data 2 also have been correspondingly sent to the first and second base stations.

Referring to Table 1, if the number of appearance for Index 1 in Table 1 is greater than 10, then all base stations, which are determined to have already received Index 1 and Original data 1, includes the first and second base stations.

Step 103 is to, for each of all the base stations, query in a pre-built base station classification table, determine other base stations which are the same type as the base station, and select, from the other base stations, base stations which have not received the popular index and the data corresponding to the popular index as target base stations.

Before pre-synchronously sending the popular index and the data corresponding to the popular index, the base station may built a base station classification table for all the base stations being managed, the names of the base stations of the same type are associated and added to the base station classification table. There are multiple schemes for the RNC to classify the base stations. The base stations may be classified according to a preset rule. For example:

the base stations may be classified according to a region where the base stations are located, such as a business region, a financial region, an information region and a residential region; and the base station may be classified adaptively, a method for adaptive classification is to acquire user data of each base station, analyze key word of the user data of each base station by a Deep Packet Inspection (DPI); and classify the base stations containing a same key word with the number of the same key word being greater than a preset value as base stations of the same type; the same key word described in the embodiment denotes a same key word, a similar key word or a key word of the same type; for example, the key word is firstly classified and may be classified as "financial type", "information type" and "residential type", the key word related to the financial type, such as "securities", "stock" or "investment", is classified into the financial type, the key word related to information, such as "switch board", "data" or "pulse", is classified into the information type, and the word such as "diet", "purchase" or "housing" is classified into the life type; the base station containing the same type of key word with the number of the same type of key word being greater than a preset value is classified as the base station of the same type; for example, there are many key words of residential type among the key words of the user data of the first and second base stations, and the number of the key word of the above type is greater than a preset value, then the first and second base stations are classified as the base stations of the same type; the preset value herein is a numerical value such as 50, or 60; if there are two base stations each containing over 60 key words of the financial type, then the two base stations may be classified as the base stations of the same type.

A further classification method is to count the number of appearance for each of all the indexes in each of the base stations being managed, classify a base station in which the number of appearance for the same index is lager than a second preset threshold as the base station of the same type. The second preset threshold is also a numerical value. For example, if one index appears for 5 times in the first base station, 6 times in a third base station, 6 times in a fourth base station and 8 times in a sixth base station, and the second preset threshold is 4, then the above four base stations may be classified as the base stations of the same type; if another index appears 5 times in a fifth base station, 6 times in the second base stations, 6 times in a seventh base stations and 8 times in an eighth base stations, then the above four base stations may be another type of base stations. Such classification for base stations may be presented through Table 2 as follows.

TABLE 2

Base station classification table

| Type | Base station |
|---|---|
| Type 1 | first base station, sixth base station, third base station, fourth base station |
| Type 2 | fifth base station, second base station, seventh base station, eighth base station |
| ... | ... |

All base stations determined in Step 102 includes the first and second base stations. Due to different types of the first and second base stations, other base stations of the same type as the first base station and other base stations of the same type as the second base station are determined by querying a pre-built base station classification table 2. It can be seen from Table 2, the other base stations of the same type as the first base station include the third, fourth and sixth base stations; and the other base stations of the same type as the second base station include the fifth, seventh and eighth base stations.

The third to eighth base stations do not appear at the position corresponding to Index 1 and Original data 1. This indicates that the third to eighth base stations have not received Index 1 and Original data 1. Then the third to eighth base stations are considered as target base stations.

Step 104 is to send the popular index and the data corresponding to the popular index to one of the target base stations, in the case where a data link from the network device to the target base station is idle.

After target base stations are queried in Step 103, it can be predicted that the target base stations may also receive the popular index and the data corresponding to the popular index. In this case, when a data link from the RNC to the target base stations is idle, the popular index and the data corresponding to the popular index may be sent to the target base stations previously. In conjunction with Table 1 and Table 2 mentioned above, in the case where the third to eighth base stations are determined as the base stations of the same type as either the first base station or the second base station and the RNC has not synchronously sent Index 1 and Original data 1 to the third to eighth base stations, then the RNC pre-synchronously may send Index 1 and Original data 1 to each of the third to eighth base stations when the data link from the RNC to the base station is idle. Then, in the case where Index 1 and Original data 1 are sent to the third to eighth base stations, a loss of Original data 1 and impossible decompressing for Index 1 on the base station side may be avoided if the link is busy. Before sending Index 1 and Original data 1, RNC firstly detects the amount of data on the data link from the network device to the target base station, and then determines that the link is in an idle state when the amount of data on the link is less than a preset threshold. If the link is idle, the popular index and the data corresponding to the popular index are immediately sent to the base station corresponding to the idle link. If there is an idle link, the popular index and the data corresponding to the popular index are firstly pre-synchronously sent to the base station corresponding to an idle link, and they are not needed to be sent to all the base stations synchronously.

In the embodiment of the present disclosure, a network device selects a popular index with a high frequency of appearance from all indexes stored by the network device; determines, among base stations being managed, other base stations of the same type as a base station having received the popular index, and sends the popular index and data corresponding to the popular index to the determined base station when a link to the determined base station is idle. In comparison with an existing method in which an index and data corresponding to the index are only sent while needed, the method for content encoding pre-synchronization provided by the embodiment of the present disclosure may determine the popular index and a base station to which the popular index may be sent in advance, and send the popular index to the corresponding base station in advance when the link is idle, thereby reduces the sending delay in busy time, improves the compression ratio in busy time, and avoids a loss of synchronization data caused by a busy link.

Figure 3:
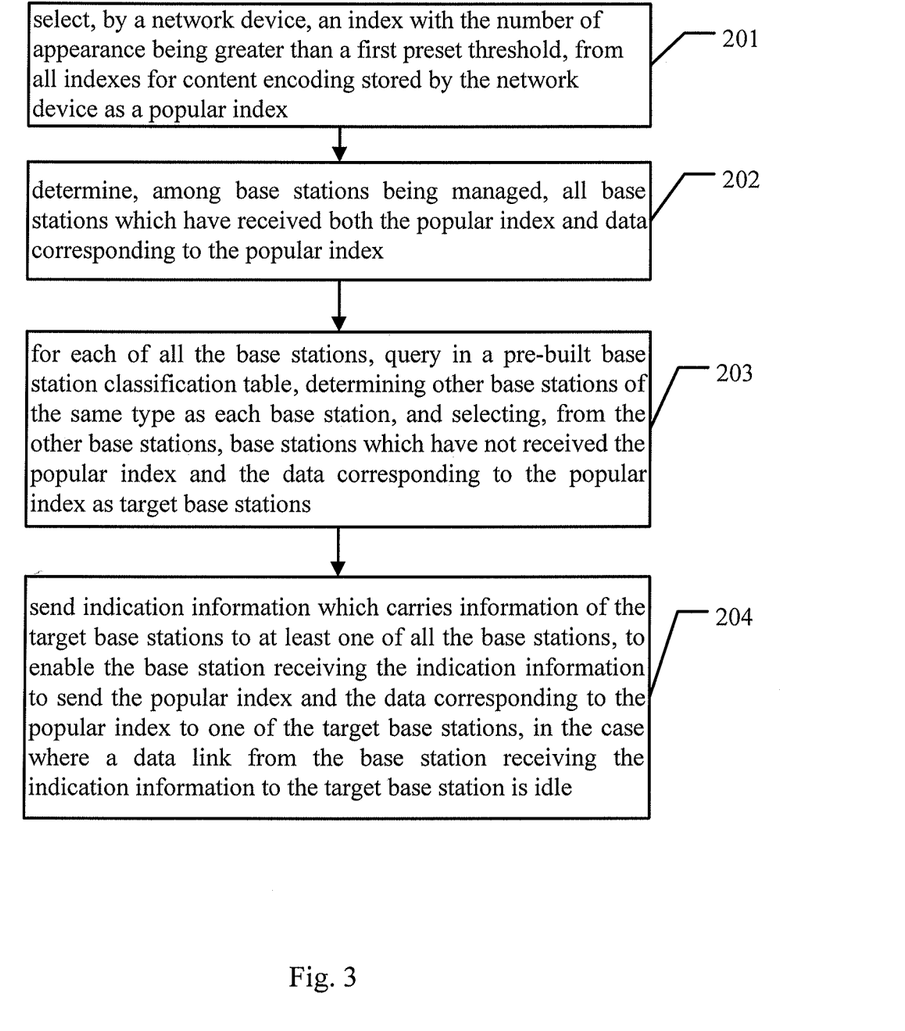
FIG. 3 is a schematic diagram of a method according to another embodiment of the present disclosure.

Referring to FIG. 3, in view of the network device, the method for content encoding pre-synchronization according to another embodiment of the present disclosure includes Steps 201 to 204.

Step 201 is to select, by a network device, an index with the number of appearance being greater than a first preset threshold, from all indexes for content encoding stored by the network device as a popular index.

The step is the same as Step 101 in the embodiment corresponding to FIG. 2, and will not be described in detail herein.

Step 202 is to determine, among base stations being managed, all base stations which have received both the popular index and data corresponding to the popular index.

The step is the same as Step 102 in the embodiment corresponding to FIG. 2, and will not be described in detail herein.

Step 203 is to, for each of all the base stations, query in a pre-built base station classification table, determine other base stations of the same type as the base station, and select, from the other base stations, base stations which have not received the popular index and the data corresponding to the popular index as target base stations.

The step is the same as Step 103 in the embodiment corresponding to FIG. 2, and will not be described in detail herein.

Step 204 is to send indication information which carries information of the target base stations to at least one of all the base stations, to enable the base station receiving the indication information to send the popular index and the data corresponding to the popular index to one of the target base stations, in the case where a data link from the base station receiving the indication information to the target base station is idle.

In the embodiment corresponding to FIG. 2, the popular index and the data corresponding to the popular index are pre-synchronously sent by the network device such as RNC. In the embodiment, instead of pre-synchronously sending the popular index and the data corresponding to the index, the RNC sends the indication information to at least one of the base stations which have received both the popular index and the data corresponding to the popular index. And the indication information carries the information of the target base stations queried in Step 102 corresponding to FIG. 2, so that the base station receiving the indication information sends the popular index and the data corresponding to the popular index to one of the target base stations when the data link from the base station receiving the indication information to the target base station is idle.

In the case where the indication information carrying information of the third to eighth base stations is sent to the first base station in Table 1, the first base station pre-synchronously sends Index 1 and Original data 1 to the base station corresponding to an idle link according to the indication information, the idle link may be any one of the data links between the first and third base stations, the first and fourth base stations, . . . , and the first and the eighth base stations is idle.

In the above technical scheme of the embodiment of the present disclosure, a network device selects a popular index with a high frequency of appearance from all indexes stored by the network device; determines, among base stations being managed, other base stations of the same type as a base station having received the popular index, and sends the popular index and data corresponding to the popular index to the determined base station when a link to the determined base station is idle. In comparison with a method in which an index and data corresponding to the index are only sent while needed in the existing technologies, the method for content encoding pre-synchronization provided by the embodiment of the present disclosure may determine the popular index and a base station to which the popular index may be sent in advance, and send the popular index to the corresponding base station in advance when the link is idle, thereby reduces the sending delay in busy time, improves the compression ratio in busy time, and avoids a loss of synchronization data caused by a busy link.

Figure 4:
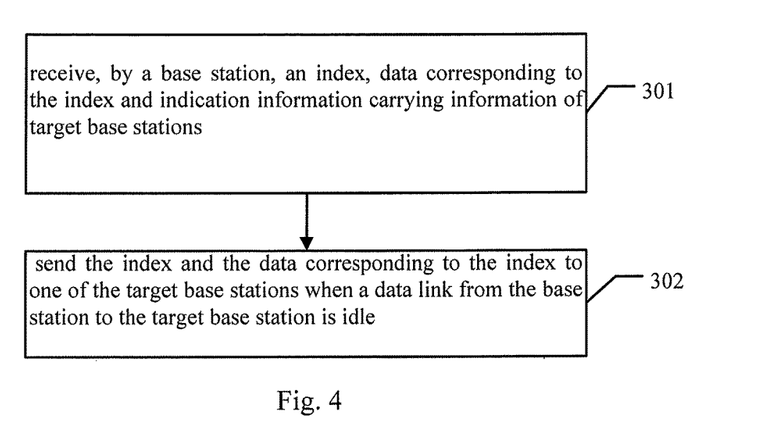
FIG. 4 is a schematic diagram of a method according to a further embodiment of the present disclosure.

Referring to FIG. 4, in view of base station, the method for content encoding pre-synchronization according to a further embodiment of the present disclosure includes Steps 301 to 302.

Step 301 is to receive, by a base station, an index for content encoding, data corresponding to the index and indication information carrying information of target base stations.

After receiving the index and the data corresponding to the index, the base station may correspondingly store the popular index and the data corresponding to the popular index. Then, upon receiving the index for a second time, the base station replaces the index with the data corresponding to the index to restore the original data, which is the process of decompressing.

The base station may further receive the indication information carrying the information of the target base stations. For example, after receiving Index 1 and Original data 1, the first base station further receives the indication information carrying the information of the third to eighth base stations.

Step 302 is to send the index and the data corresponding to the index to one of the target base stations, in the case where a data link from the base station to the target base station is idle.

After receiving the indication information, the base station may firstly detect the amount of data on the data link from the base station to the target base station; determine the link is idle when the amount of data on the link is less than a preset threshold; and after determining that the link is idle, synchronously sends the index and the data corresponding to the index to the base station corresponding to the idle link.

In accordance with the above example, after receiving the indication information, the first base station may pre-synchronously send Index 1 and Original data 1 to the third to eighth base stations according to the indication by the indication information, when each of the links between the first and third base stations, . . . and the first and the eighth base stations is idle. Index 1 and the Original data 1 are firstly pre-synchronously sent to the base station corresponding to an idle link, and do not need to be sent to all the base stations synchronously.

In the embodiment of the present disclosure, a base station receives an index, data corresponding to the index and indication information, and sends the index and the data corresponding to the popular index to one of target base stations according to the indication information when a data link from the base station to the target base station is idle. In comparison with an existing method in which an index and data corresponding to the index are only sent while needed, the method for content encoding pre-synchronization provided by the embodiment of the present disclosure may reduce the sending delay in busy time, improve the compression ratio in busy time, and avoid a loss of synchronization data caused by a busy link.

Figure 5:
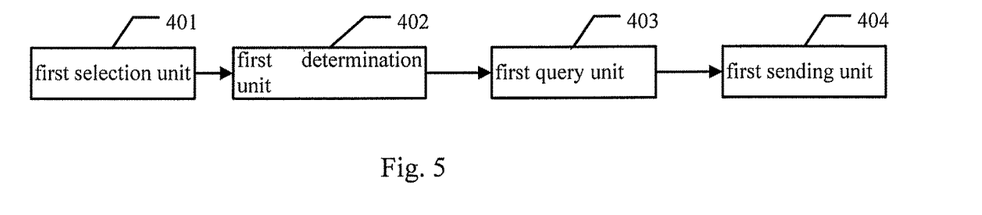
FIG. 5 is a schematic diagram of a network device according to an embodiment of the present disclosure.

Referring to FIG. 5, a network device according to an embodiment of the present disclosure includes:

a first selection unit 401, configured to select an index with the number of appearance being greater than a first preset threshold, from all indexes for content encoding stored by the network device as a popular index;

a first determination unit 402, configured to determine, among base stations being managed, all base stations having received both the popular index acquired by the first selection unit 401 and data corresponding to the popular index;

a first query unit 403, configured to, for each of all the base stations determined by the first determination unit 402, query in a pre-built base station classification table, determine other base stations of the same type as the base station, and select, from the other base stations, base stations which have not received the popular index and the data corresponding to the popular index, as target base stations; and a first sending unit 404, configured to send the popular index and the data corresponding to the popular index to one of the target base stations queried by the first query unit 403, in the case where a data link from the network device to the target base station is idle.

In the embodiment of the present disclosure, an popular index with a high frequency of appearance is selected form all indexes stored by a network device; other base stations of the same type as a base station having received the popular index is determined from all base stations being managed; and the popular index and the data corresponding to the popular index are sent to the determined base station when a link to the determined base station is idle. In comparison with an existing method in which an index and data corresponding to the index are only sent while needed, the method for content encoding pre-synchronization provided by the embodiment of the present disclosure may determine the popular index and a base station to which the popular index may be sent in advance, and send the popular index to the corresponding base station in advance when the link is idle, thereby reduces the sending delay in busy time, improves the compression ratio in busy time, and avoids a loss of synchronization data caused by a busy link.

Figure 6:
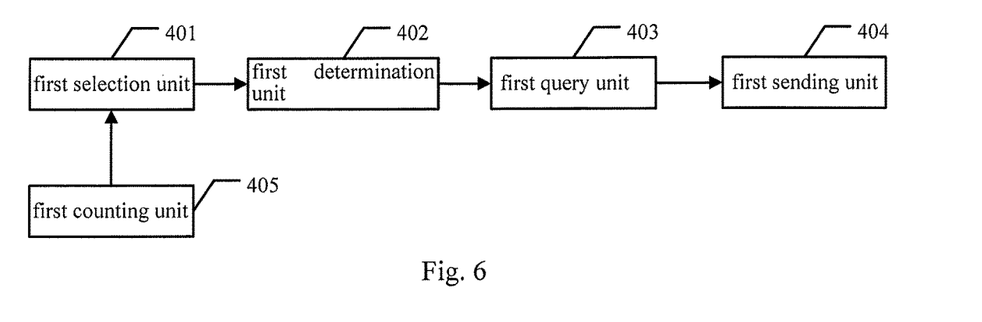
FIG. 6 is a schematic diagram of a network device according to another embodiment of the present disclosure.

Referring to FIG. 6, based on the above embodiment corresponding to FIG. 5, a network device according to another embodiment of the present disclosure further includes:

a first counting unit 405, configured to count the number of appearance for each of all the indexes in the network device, and record the name of the base station to which each index is sent, before the first selection unit 401 selects the popular index.

Figure 7:
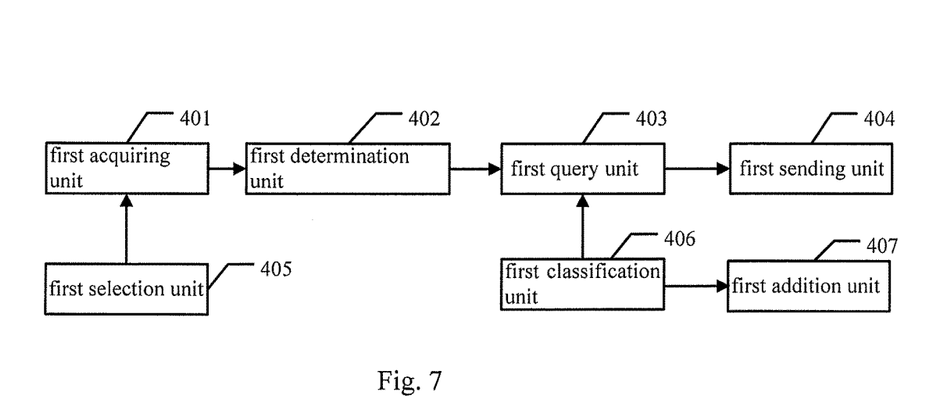
FIG. 7 is a schematic diagram of a network device according to a further embodiment of the present disclosure.

Referring to FIG. 7, based on the above embodiment corresponding to FIG. 5 or 6, a network device according to a further embodiment of the present disclosure further includes:

a first classification unit 406, configured to, for all the base stations being managed, find out base stations of the same type in accordance with a preset classification rule, before the first query unit 403 queries in the pre-built base station classification table; and a first addition unit 407, configured to associate the name of the base stations of the same type found out by the first classification unit 406 and add the name of the base stations of the same type into the base station classification table.

Figure 8:
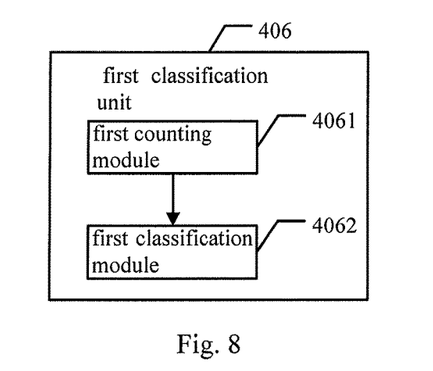
FIG. 8 is a schematic diagram of a network device according to a further embodiment of the present disclosure.

Referring to FIG. 8, based on the embodiment corresponding to FIG. 7, the first classification unit 406 in the network device according to the embodiment of the present disclosure includes:

a first counting module 4061, configured to count the number of appearance for each of all the indexes in each of the base stations being managed; and a first classification module 4062, configured to classify all base stations, counted by the first counting module 4061, in which the number of appearance for the same index is greater than a second preset threshold as the base stations of the same type.

Figure 9:
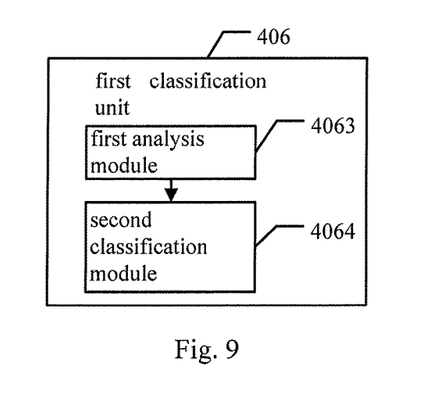
FIG. 9 is a schematic diagram of a network device according to a further embodiment of the present disclosure.

Referring to FIG. 9, based on the embodiment corresponding to FIG. 7, the first classification unit 406 in a network device according to an embodiment of the present disclosure includes:

a first analysis module 4063, configured to analyze a key word of user data of each base station by a deep packet inspection (DPI); and a second classification module 4064, configured to classify a base station containing the same key words as the base station of the same type, wherein the same key words are analyzed by the first analysis module 4063, and the number of the same key words is greater than a preset value.

Figure 10:
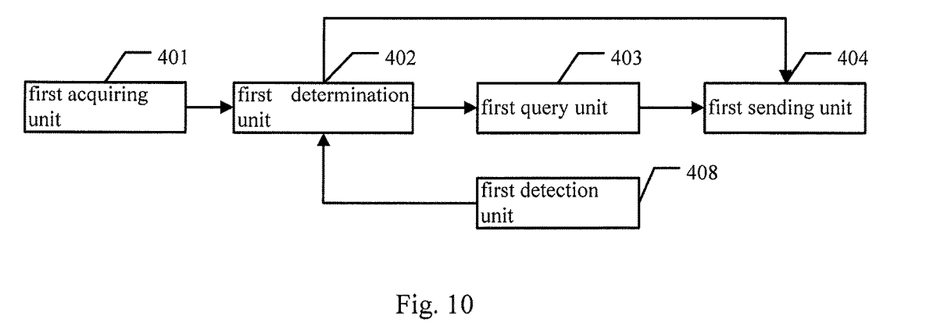
FIG. 10 is a schematic diagram of a network device according to a further embodiment of the present disclosure.

Referring to FIG. 10, based on the embodiment corresponding to FIG. 5, a network device according to an embodiment of the disclosure further includes:

a first detection unit 408, configured to detect the amount of data on the data link from the network device to the target base station; and the first determination unit 402 being further configured to determine that the link is in an idle state in the case where the amount of data on the link detected by the first detection unit 408 is less than a preset threshold.

The network device provided by the multiple embodiments of the present disclosure may reduce the sending delay in busy time, improve the compression ratio in busy time, and further avoid a loss of synchronization data caused by a busy link.

Figure 11:
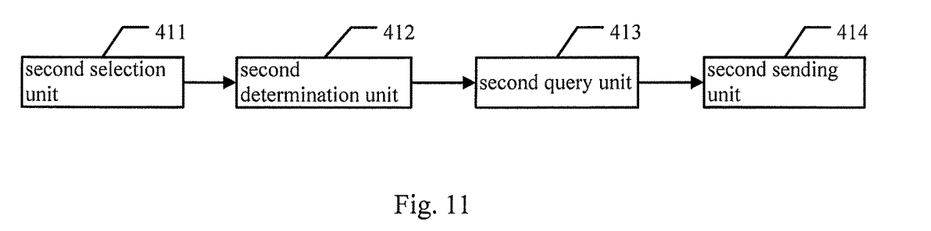
FIG. 11 is a schematic diagram of a network device according to a further embodiment of the present disclosure

Referring to FIG. 11, a network device according to a further embodiment of the present disclosure includes:

a second selection unit 411, configured to select an index of which the number of appearance is greater than a first preset threshold, from all indexes for content encoding stored by the network device as a popular index;

a second determination unit 412, configured to determine, among base stations being managed, all base stations having received both the popular index acquired by the second selection unit 411 and data corresponding to the popular index;

a second query unit 413, configured to, for each of all the base stations determined by the second determination unit 412, query in a pre-built base station classification table, determine other base stations of the same type as each base station, and select, from the other base stations, base stations which have not received the popular index and the data corresponding to the popular index as target base stations; and a second sending unit 414, configured to send indication information, which carries information of the target base station queried by the second query unit 413, to at least one of all the base stations determined by the second determination unit 412, to enable the base station receiving the indication information to send the popular index and the data corresponding to the popular index to one of the target base stations, in the case where a data link from the base station receiving the indication information to the target base station is idle.

In the embodiment of the present disclosure, an popular index with a high frequency of appearance is selected form all indexes stored by a network device; other base stations of the same type as a base station having received the popular index is determined from all base stations being managed; and the popular index and data corresponding to the popular index are sent to the determined base stations when a link to the determined base stations is idle. In comparison with a method in which an index and data corresponding to the index are only sent while needed in the existing technologies, the method for content encoding pre-synchronization provided by the embodiment of the present disclosure may determine the popular index and a base station to which the popular index may be sent in advance, and send the popular index to the corresponding base station in advance when the link is idle, thereby reduces the sending delay in busy time, improves the compression ratio in busy time, and avoids a loss of synchronization data caused by a busy link.

Figure 12:
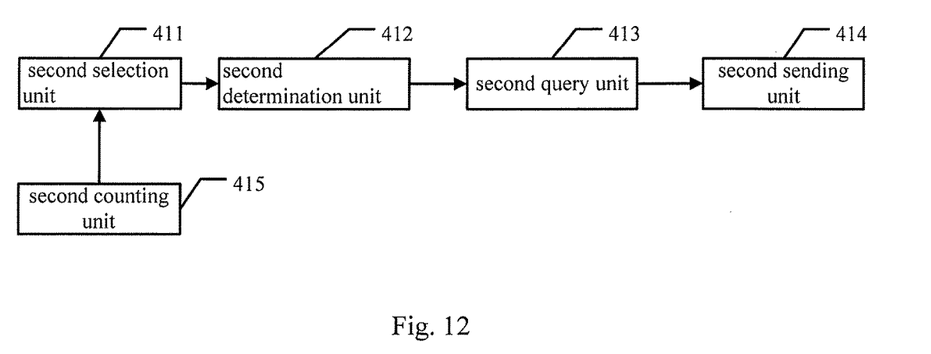
FIG. 12 is a schematic diagram of a network device according to a further embodiment of the present disclosure.

Referring to FIG. 12, based on the embodiment corresponding to FIG. 11, a network device according to an embodiment of the present disclosure further includes:

a second counting unit 415, configured to count the number of appearance for each of all the indexes in the network device, and record the names of the base stations to which each index is sent, before the second selection unit 411 selects the popular index.

Figure 13:
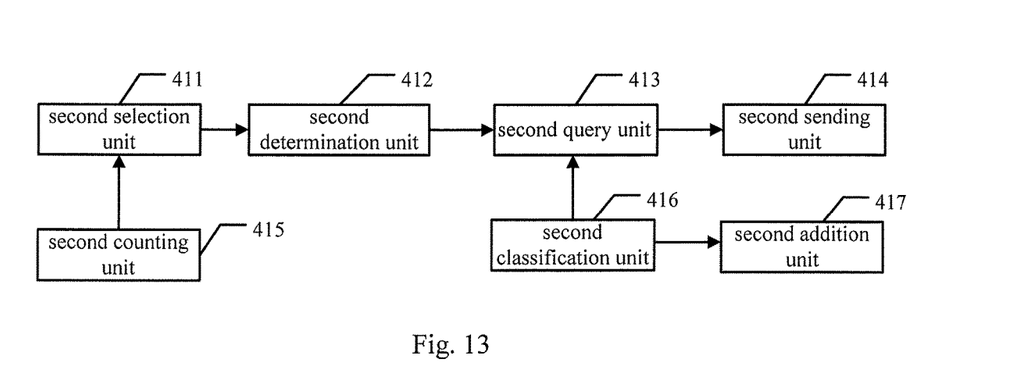
FIG. 13 is a schematic diagram of a network device according to a further embodiment of the present disclosure.

Referring to FIG. 13, based on the embodiment corresponding to FIG. 11 or 12, a network device according to an embodiment of the present disclosure further includes:

a second classification unit 416, configured to, from all the base stations being managed, find out base stations of the same type in accordance with a preset classification rule, before the second query unit 413 queries in the pre-built base station classification table; and a second addition unit 417, configured to associate the names of the base stations of the same type found out by the second classification unit 416 and add the names of the base stations of the same type found out by the second classification unit 416 into the base station classification table.

Based on the embodiment corresponding to FIG. 13, a network device provided by an embodiment of the present disclosure further includes: the second classification unit 416 including:

a second counting module, configured to count the number of appearance for each of all the indexes in each of the base stations being managed; and a third classification module, configured to classify all base stations, counted by the second counting module, in which the number of appearance for the same index is greater than a second preset threshold, as base stations of the same type.

Based on the embodiment corresponding to FIG. 13, a network device provided by an embodiment of the present disclosure further includes: the second classification unit 416 including:

a second analysis module, configured to analyze a key word of user data of each base station by a deep packet inspection (DPI); and a fourth classification module, configured to classify a base station containing the same key words as the base station of the same type, wherein the same key words are analyzed by the second analysis module and the number of the same key words is greater than a preset value.

The network device provided by the multiple embodiments of the present disclosure may reduce the sending delay in busy time, improve the compression ratio in busy time, and further avoid a loss of synchronization data caused by a busy link.

Figure 14:
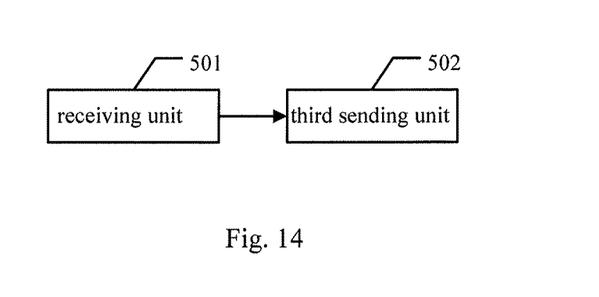
FIG. 14 is a schematic diagram of a base station according to an embodiment of the present disclosure.

Referring to FIG. 14, a base station according to an embodiment of the present disclosure includes:

a receiving unit 501, configured to receive an index for content encoding, data corresponding to the index and indication information carrying information of a target base station; and;

a third sending unit 502, configured to send the index and the data corresponding to the index received by the receiving unit 501 to one of the target base stations, in the case where a data link from the base station to the target base station is idle.

In the embodiment of the present disclosure, the receiving unit receives an index, data corresponding to the index and indication information carrying information of target base stations. The third sending unit sends the index and the data corresponding to the index, which are received by the receiving unit, to one of the target base stations when a data link from the base station to the target base station is idle. Thereby, the sending delay in busy time is reduced, the compression ratio in busy time is improved, and a loss of synchronization data caused by a busy link is avoided.

Figure 15:
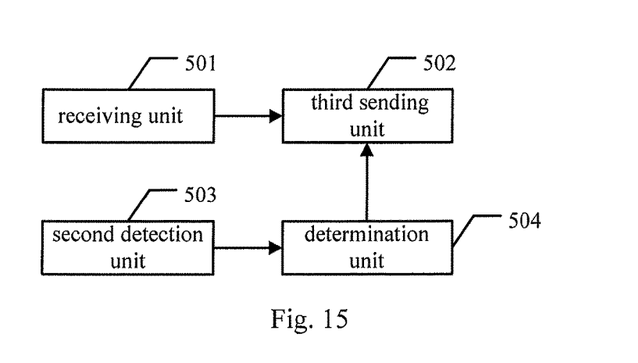
FIG. 15 is a schematic diagram of a base station according to another embodiment of the present disclosure.

Referring to FIG. 15, a base station according to another embodiment of the present disclosure further includes:

a second detection unit 503, configured to detect the amount of data on the data link from the base station to the target base station; and a determination unit 504, configured to determine that the link is in an idle state in the case where the amount of data on the link detected by the second detection unit 503 is less than a preset threshold.

Figure 16A:
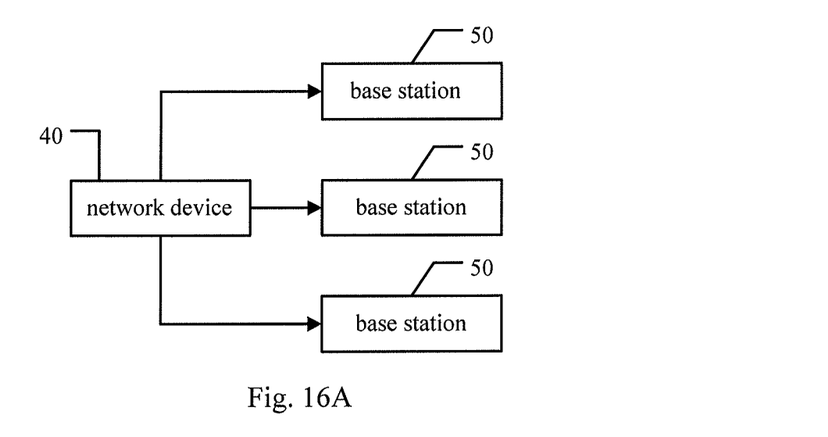
FIG. 16A is schematic diagram of a system according to an embodiment of the present disclosure.

Referring to FIG. 16A, a system according to an embodiment of the present disclosure includes Network device 40 and Base station 50.

Network device 40 is configured to select an index with the number of appearance being greater than a first preset threshold, from all indexes for content encoding stored by the network device as a popular index; determine, among base stations being managed, all base stations having received both the popular index acquired by the first selection unit and data corresponding to the popular index; for each of all the base stations, query in a pre-built base station classification table, determine other base stations of the same type as each base station, and select, from the other base stations, base stations which have not received the popular index and the data corresponding to the popular index as target base stations; and send the popular index and the data corresponding to the popular index to one of the target base stations queried by the first query unit, in the case where a data link from the network device to the target base station is idle.

Base station 50 is configured to receive the popular index and the data corresponding to the popular index sent by the network device, and correspondingly store the popular index and the data corresponding to the popular index, and perform decompression when receiving the popular index later.

Figure 16B:
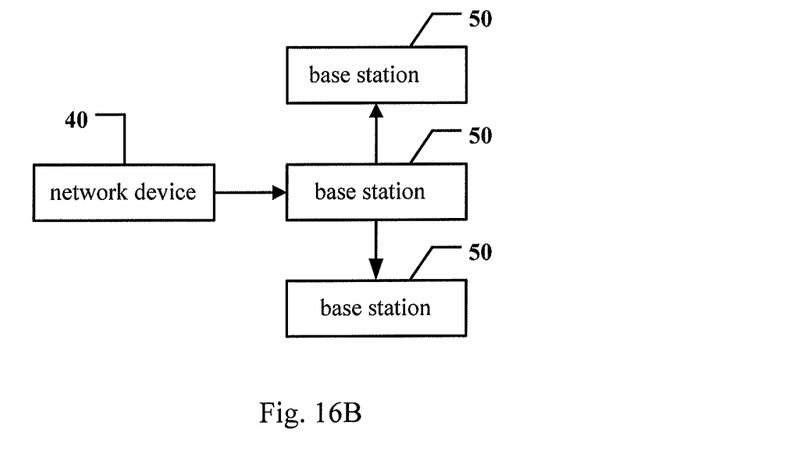
FIG. 16B is a schematic diagram of a system according to another embodiment of the present disclosure.

Referring to FIG. 16B, a system according to another embodiment of the present disclosure includes Network device 40 and Base station 50.

Network device 40 is configured to select an index of which the number of appearance is greater than a first preset threshold, from all indexes for content encoding stored by the network device as a popular index; determine, among base stations being managed, all base stations having received both the popular index acquired by the first selection unit and data corresponding to the popular index; for each of all the base stations, query in a pre-built base station classification table, determine other base stations of the same type as each base station, and select, from the other base stations, base stations which have not received the popular index and the data corresponding to the popular index as target base stations; and send indication information, which carries information of the target base station, to at least one of all the base stations, to enable the base station receiving the indication information to send the popular index and the data corresponding to the popular index to one of the target base stations, in the case where a data link from the base station receiving the indication information to the target base station is idle.

Base station 50 is configured to receive the popular index and the data corresponding to the popular index.

In a further embodiment, base station 50 is further configured to receive the indication information carrying the information of the target base stations, and send the popular index and the data corresponding to the popular index to one of the target base stations in the case where the data link from the base station to the target base station is idle.

It should be noted that, the embodiments disclosed by the present disclosure are not limited to the methods listed by the above embodiments. For other communication system such as a wire communication system, in the case where a content encoding technology is used to compress data, if a scenario requirement is similar to the background of the present disclosure, then the pre-synchronization for data compression in the scheme of the present disclosure may be also employed to reduce the sending delay in a busy time, to avoid the link congestion, and improve the compression ration in a busy time.

It should be understood by those skilled in the art, all or a part of steps in various methods of the above embodiments may be completed by instructing related hardware by a program, which may be stored in a computer readable storage medium, including ROM, RAM, magnetic or optical disk, and the like.

In the above, the method, device and system for content encoding pre-synchronization provided by the embodiments of the present disclosure are described in detail. The principle and embodiments of the present disclosure are described by applying specific examples herein. The above descriptions of the embodiments are only used to help to understand the method and core concept of the present disclosure. In addition, for those skilled in the art, there may be changes on the embodiments and the range of application according to the concept of the present disclosure. In summary, the content of the specification should not be understood as the limit of the present disclosure.

The invention claimed is:

1. A method for content encoding pre-synchronization, comprising:
    selecting, by a network device, an index, with the number of appearance being greater than a first preset threshold, from all indexes for content encoding stored by the network device as a popular index;
    determining, among a plurality of base stations being managed, all base stations which have received both the popular index and data corresponding to the popular index;
    for each one of all the base stations which have received both the popular index and data corresponding to the popular index, querying in a pre-built base station classification table, determining that other base stations have a type the same as the one of the base stations, and selecting, from the other base stations, base stations which have not received the popular index and the data corresponding to the popular index as target base stations; and
    sending the popular index and the data corresponding to the popular index to one of the target base stations, in the case where a data link from the network device to the one of the target base station is idle.

2. The method according to claim 1, wherein before the selecting an index with the number of appearance being greater than a first preset threshold as a popular index, the method further comprises:
    counting the number of appearance for each of all the indexes in the network device, and recording a name of a base station to which the index is sent.

3. The method according to claim 1, wherein before the querying in a pre-built base station classification table, the method further comprises:
    for all the base stations being managed, determining base stations of a same type in accordance with a preset classification rule; and
    associating the names of the determined base stations and adding the names of the determined base stations into the base station classification table.

4. The method according to claim 3, wherein the determining base stations of the same type in accordance with a preset classification rule comprises:
    counting the number of appearance for each one of all the indexes in each of the base stations being managed; and
    classifying ail base stations in which the number of appearance for the one of the indexes is greater than a second preset threshold as the same type of the base stations.

5. A method for content encoding pre-synchronization, comprising:

selecting, by a network device, an index with the number of appearance being greater than a first preset threshold, from all indexes for content encoding stored by the network device as a popular index;

determining, among a plurality of base stations being managed, all base stations which have received both the popular index and data corresponding to the popular index;

for each one of all the base stations, querying in a pre-built base station classification table, determining that other base stations have a type same as the one of the base stations which have received both the popular index and data corresponding to the popular index, and selecting, from the other base stations, base stations which have not received the popular index and the data corresponding to the popular index as target base stations; and sending indication information which carries information of the target base stations to at least one of all the base stations, to enable the base station receiving the indication information to send the popular index and the data corresponding to the popular index to one of the target base stations, in the case where a data link from the base station receiving the indication information to the one of the target base station is idle.

6. The method according to claim 5, wherein before the selecting an index of which the number of appearance is greater than a first preset threshold as a popular index, the method further comprises:
counting the number of appearance for each of all the indexes in the network device, and recording a name of a base station to which each index is sent.

7. The method according to claim 5, wherein before the querying in a pre-built base station classification table, the method further comprises:
for all the base stations being managed, determining a same type of base stations in accordance with a preset classification rule; and
associating the names of the determined base stations and adding the names of the determined base stations into the base station classification table.

8. The method according to claim 7, wherein the determining a same type of base stations in accordance with a preset classification rule comprises:
counting the number of appearance for each one of all the indexes in each of the base stations being managed; and
classifying base stations in which the number of appearance for the one of the indexes is larger than a second preset threshold as the same type of base stations.

9. A network device, comprising a processor and a memory having program code stored therein, wherein the program code is executed by the processor to:
select an index with the number of appearance being greater than a first preset threshold, from all indexes for content encoding stored by the network device as a popular index;
determine, among a plurality of base stations being managed, all base stations having received both the popular index and data corresponding to the popular index;
for each one of all the base stations having received both the popular index and data corresponding to the popular index, query in a pre-built base station classification table, determine that other base stations have a type same as the one of the base stations, and select, from the other base stations, base stations which have not received the popular index and the data corresponding to the popular index, as target base stations; and send the popular index and the data corresponding to the popular index to one of the target base stations, in the case where a data link from the network device to the one of the target base stations is idle.

10. The network device according to claim 9, wherein the program code is executed by the processor to:
count the number of appearance for each of all the indexes in the network device, and record a name of a base station to which each index is sent, before the popular index is selected.

11. The network device according to claim 9, wherein the program code is executed by the processor to:
for all the base stations being managed, determine a same type of base stations in accordance with a preset classification rule, before querying in the pre-built base station classification table; and
associate the names of the determined base stations and add the names of the determined base stations into the base station classification table.

12. The network device according to claim 11, wherein the program code is executed by the processor to
count the number of appearance for each of all the indexes in each of the base stations being managed; and
classify all base stations in which the number of appearance for one of the indexes is greater than a second preset threshold as the same type of the base stations.

13. A network device, comprising a processor and a memory having program code stored therein, wherein the program code is executed by the processor to:
select an index with the number of appearance being greater than a first preset threshold, from all indexes for content encoding stored by the network device as a popular index;
determine, among a plurality of base stations being managed, all base stations having received both the popular index and data corresponding to the popular index;
for each one of all the base stations determined by the second determination unit as having received both the popular index and data corresponding to the popular index, query in a pre-built base station classification table, determine that other base stations have a type same as the one of the base stations, and select, from the other base stations, base stations which have not received the popular index and the data corresponding to the popular index as target base stations; and
send indication information, which carries information of the target base stations, to at least one of all the base stations, to enable the base station receiving the indication information to send the popular index and the data corresponding to the popular index to one of the target base stations, in the case where a data link from the base station receiving the indication information to the one of the target base stations is idle.

14. The network device according to claim 13, wherein the program code is executed by the processor to:
count the number of appearance for each of all the indexes in the network device, and record a name of a base station to which each index is sent, before the popular index is selected.

15. The network device according to claim 13, wherein the program code is executed by the processor to:
for all the base stations being managed, determine a same type of base stations in accordance with a preset classification rule, before querying in the pre-built base station classification table; and associate the names of the determined base stations and add the names of the determined base stations into the base station classification table.

16. The network device according to claim 15, wherein the program code is executed by the processor to:
count the number of appearance for each one of all the indexes in each of the base stations being managed; and
classify base stations, in which the number of appearance for the one of the indexes is greater than a second preset threshold as the same type of base stations.

17. A system for content encoding pre-synchronization, comprising: a network device and at least one base station; wherein the network device is configured to: select an index of which the number of appearance is greater than a first preset threshold, from all indexes for content encoding stored by the network device as a popular index; determine, among a plurality of base stations being managed, all base stations having received both the popular index acquired by the first selection unit and data corresponding to the popular index; for each one of all the base stations having received both the popular index and data corresponding to the popular index, query in a pre-built base station classification table, determine that other base stations have a type same as the one of the base stations, and select, from the other base stations, base stations which have not received the popular index and the data corresponding to the popular index as target base stations; and send the popular index and the data corresponding to the popular index to one of the target base stations queried by the first query unit, in the case where a data link from the network device to the target base station is idle; and
wherein the base station is configured to receive the popular index and the data corresponding to the popular index sent by the network device.

18. The system according to claim 17, wherein the network device is further configured to, before the querying in the pre-built base station classification table, for all the base stations being managed, determine a same type of base stations in accordance with a preset classification rule, and associate the names of the determined base stations and add the names of the determined base stations into the base station classification table.

* * * * *

UNITED STATES PATENT AND TRADEMARK OFFICE
CERTIFICATE OF CORRECTION

PATENT NO. : 9,602,632 B2
APPLICATION NO. : 14/463131
DATED : March 21, 2017
INVENTOR(S) : Wei Zhang et al.

Page 1 of 1

It is certified that error appears in the above-identified patent and that said Letters Patent is hereby corrected as shown below:

In the Claims

In Column 16, Claim 4, Line 62, after "classifying" replace "ail base" with --all base--.

Signed and Sealed this
First Day of May, 2018

Andrei Iancu
*Director of the United States Patent and Trademark Office*